Figure 6:
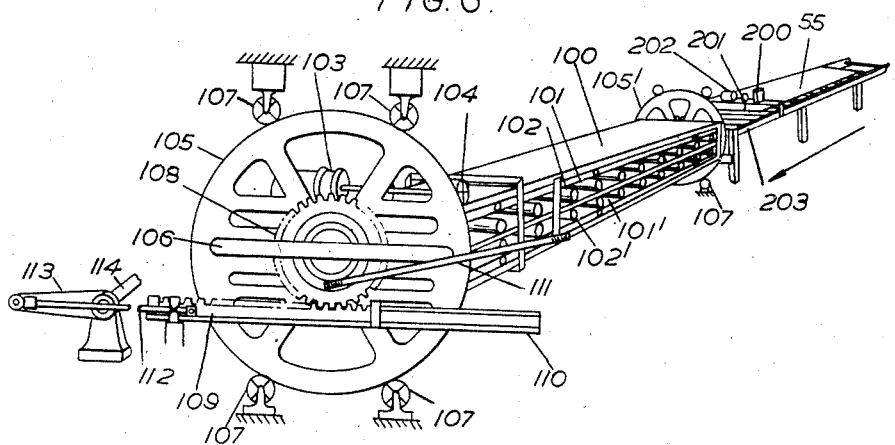

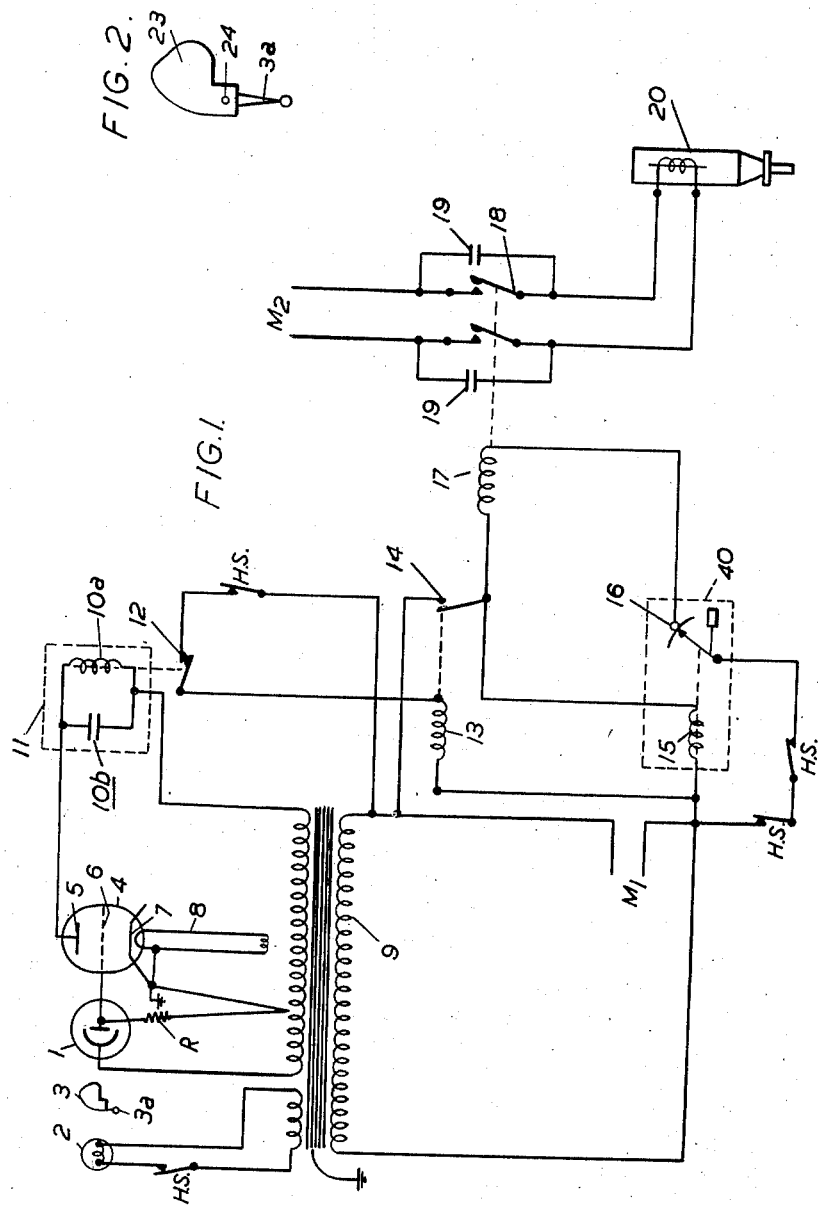

Dec. 30, 1952   W. H. MACLENNAN ET AL   2,623,627
HANDLING OF BUILDING BOARDS
Filed July 10, 1950                    3 Sheets-Sheet 2
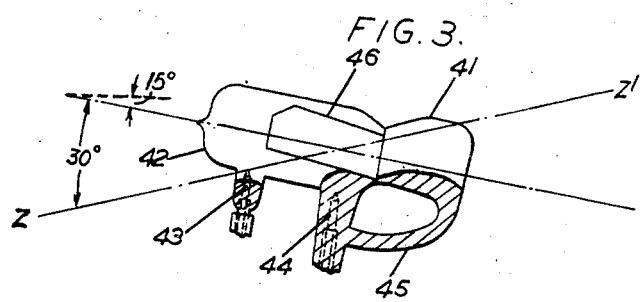
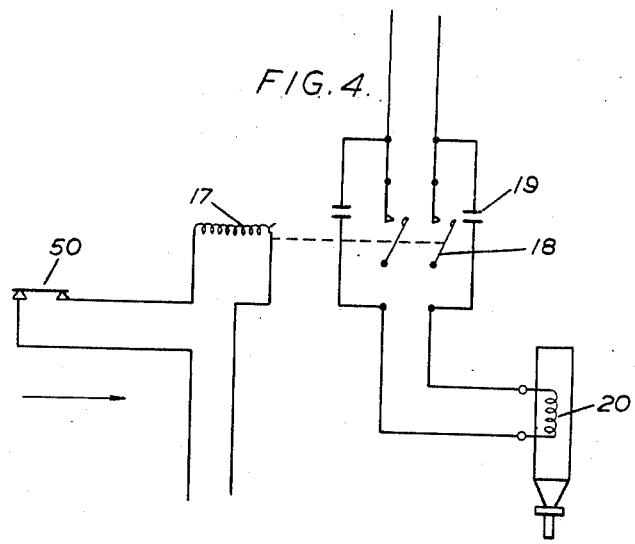
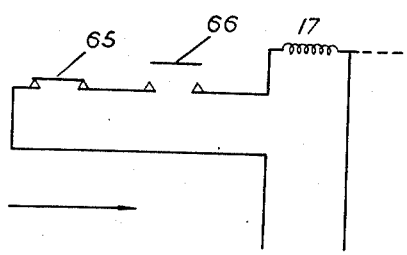
Inventors
WILLIAM HECTOR MACLENNAN
ERNEST CAMERON CLARK
WILLIAM JAMES DOUGLAS LOWRIE, DECEASED,
BY MARY LOWRIE, EXECUTRIX.
BY Cushman, Darby & Cushman
Attorneys Dec. 30, 1952     W. H. MACLENNAN ET AL     2,623,627
HANDLING OF BUILDING BOARDS Filed July 10, 1950     3 Sheets-Sheet 3

Inventors
WILLIAM HECTOR MACLENNAN
ERNEST CAMERON CLARK
WILLIAM JAMES DOUGLAS LOWRIE, DECEASED,
BY, MARY LOWRIE, EXECUTRIX.
BY Cushman, Darby & Cushman
Attorneys Patented Dec. 30, 1952

2,623,627

UNITED STATES PATENT OFFICE 2,623,627

HANDLING OF BUILDING BOARDS

William Hector Maclennan and Ernest Cameron Clark, Norton-on-Tees, England, and William James Douglas Lowrie, deceased, late of Middlesbrough, England, by Mary Lowrie, executrix, Middlesbrough, England, assignors to Imperial Chemical Industries Limited, a corporation of Great Britain Application July 10, 1950, Serial No. 172,852
In Great Britain July 29, 1949

14 Claims. (Cl. 198—33)

This invention relates to the handling of wallboards, especially gypsum plasterboards, or other sheet material.

In the production or processing of wallboards, it is commonly desired, especially where the process includes a conveyor system, to invert the boards at some stage of the process in order to prevent or reduce deterioration, during subsequent operations, of that face of the boards which was prior to inverting on the under side. This applies particularly in the manufacture of plasterboards in which, as commonly practised, board is formed as a continuous sheet from two webs of paper and a wet gypsum plaster core mix by passage through the nip of a pair of rolls and is, after the core has set, cut into suitable lengths and subsequently dried by passage through a kiln. In this process, if best quality board is to be made, it is desirable to form the board at the rolls with the face to be exposed in subsequent use, i. e. the decorative face, on the underside. This face can be largely preserved from deterioration during transit from the rolls to the cutter by employing a rubber band conveyor, which is readily kept clean, but would, if there were no inversion of the boards, be damaged during subsequent processing by scratching or soiling through contact with the roller conveyors, almost always employed in the kiln feed equipment and the kiln itself, which become coated with plaster and/or dirt. This difficulty has been met in the past by providing manually operated inverters between the cutter and the kiln feed section of the process. While these have been of considerable benefit, they have not proved altogether satisfactory, some of their disadvantages being: uncertainty of operation, especially at higher production speeds, causing loss of board by damage and reduced output owing to shut-downs; inability to operate at the higher production speeds, e. g., of the order of 72 feet per minute and more, to which the industry is continuously moving, thus imposing a limitation on output; and high labour and maintenance costs. The inverter, the subject of the present invention, is designed to obviate or minimise these disadvantages and, although of wider application, will now be described with particular reference to its use in the manufacture of gypsum wallboards.

Another advantage of the present novel inverter is that it has a single deck which permits more robust construction for a given weight, and halves the amount of auxiliary equipment as compared with a two deck inverter.

In use the inverter is situated in the conveyor along which the stream of boards is passing on their way to the drying kiln and is adapted to receive the lengths of board in their path of travel, to turn them bodily over and then to pass them to the conveyor which feeds them to the kiln. The boards may be, for example, from 6 feet to 12 feet in length and 3 feet or 4 feet wide. It will be seen that the cycle of the inverter comprises the following sequence of operations: reception of the boards while the frame of the receiving element is horizontal; rotation of the inverter through 180° while the wet board is held without damage therein; ejection of the inverted board while the receiving element is horizontal; and so on. With increase in production speed, an increasing trend in the industry, it becomes necessary to reduce the period of this cycle and the present invention makes it possible to achieve this end.

Figure 7:
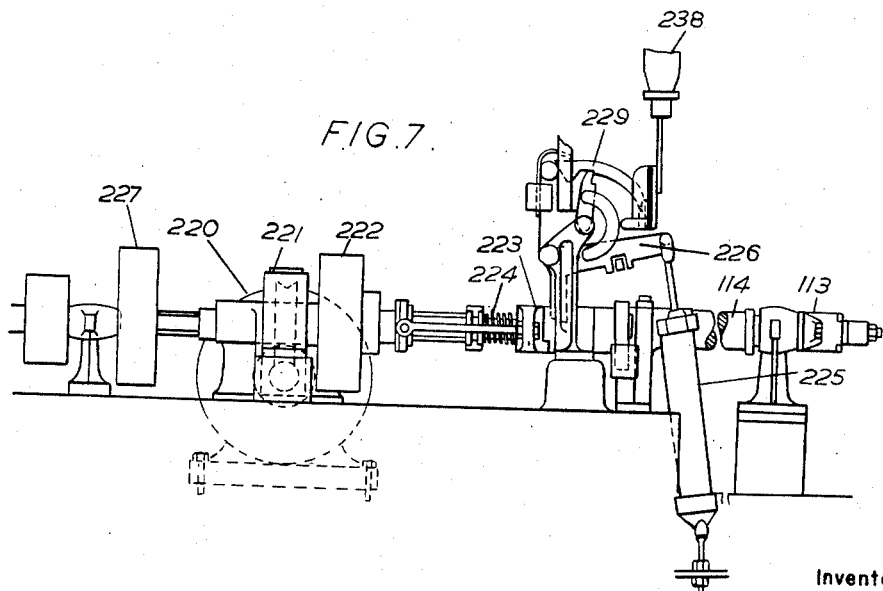

With reference to the drawings, Figures 1, 4 and 5 are diagrams of electric circuits; Fig. 2 is a side elevation of one form of shutter for a photo-electric cell; Fig. 3 is an elevation of a mercury switch; Fig. 6 is a perspective view of one form of the inverter and Fig. 7 is a side elevation of a suitable drawing element.

According to the present invention there is provided a single deck inverter for material in the form of sheets, such as plasterboard, capable of operating at high speeds which comprises in combination: a cradle, e. g. in the form of a relatively shallow frame with its long axis in the line of travel of the sheets, having housed therein at least one pair of driven conveyors adapted for reception of the sheets, and carried in and rigidly connected to two transverse circular end frames or trunnions each having a relatively large diameter, and formed with a suitably located diametral slot shaped and positioned to permit passage of the sheets, and each rotatably mounted; at least one pinion or other toothed circular member adapted to permit passage of the sheets, rigidly connected to a trunnion; a toothed member co-operating with the pinion member and adapted to rotate it through 180°, said toothed member being controlled through an electric circuit by means initiated by the moving sheets.

According to a further feature of the invention there is provided a single deck inverter, for material in the form of sheets such as plasterboard, capable of operating at high speeds which comprises, in combination: a cradle in the form of an open shallow frame with its long axis in the line of travel of the sheets, having housed therein at least one pair of driven horizontally disposed conveyors for reception of the sheets, and carried in and rigidly connected to two transverse circular end frames or trunnions, each having a relatively large diameter, and formed with a suitably located diametral slot shaped and positioned to permit passage of the sheets, and each rotatably monuted on suitably supported rollers; at least one rack wheel comprising two semi-circular toothed segments spaced to permit passage of the sheets and rigidly connected to the outer face of a trunnion; at least one horizontal rack co-operating with the toothed segments, and adapted for movement in slides, and which has a traverse just sufficient to rotate the rack wheel through 180°; at least one strong spring attached at one end to a rack wheel and at the other to an external fixed point; at least one connecting rod for moving the rack or racks motivated by a crank or cranks situated on a countershaft, which is compelled to make one half revolution and stop; means for driving the countershaft; and means for initiating the driving of the countershaft controlled by the moving sheets.

The means for initiating the driving of the countershaft may comprise, for example; a photo-electric cell controlled by the movement of the moving sheets and an electric circuit controlling a solenoid, or mechanical or mercury switches operating a solenoid through an electric circuit.

The inverter is described above in its broad scope and it is possible to vary a number of the elements within this broad scope.

It is preferred, because of the resulting benefits of robustness, improved balance, reduction in torsional stresses and greater ability to withstand hard wear, to provide two rack wheels, one on each trunnion, and each provided with its spring, co-operating rack, connecting rod and crank.

While with some sheet materials, e. g., fibreboard, the conveyors may suitably be roller conveyors, it is preferred in the case of plasterboard, on account of its ready susceptibility to damage in the undried conditions, to employ belt conveyors. The drive for these conveyors should be capable of being stopped almost instantaneously and this can be achieved by fitting the motor with a brake which can be very rapidly applied, preferably an electro-magnetic shoe brake.

The requirement that the countershaft should make one half revolution and stop is that it may fulfil its function of rotating the cradle through the angle of 180° necessary for each inversion, and the rotation of the countershaft is initiated through suitable intermediaries already indicated and to be described more fully hereinafter. It is most convenient for the drive for the countershaft to run continuously, and then the one-half-revolution-and-stop cycle of the shaft may be effected by means of a one-revolution-and-stop clutch, comprising clutch plates and a dog having two members provided, one with a large and small slot spaced at 180°, and the other with co-operating dogs similarly spaced, through a 2:1 reduction gear, the clutch being initiated by a solenoid controlled by a photo-electric cell, or other means, through a suitable electric circuit. In place of the above clutch plates, dog, and gear, there may be used a half-revolution-and-stop-clutch comprising clutch plates and a dog having two members provided, one with two exactly similar slots spaced at 180°, and the other with two co-operating dogs similarly spaced.

Alternatively, although not with such good results, the mechanical clutch may be replaced by an electrical clutch comprising, for example, friction discs magnetically operated and fitted with a brake, which clutch can be initiated by a photo-electric cell through an electric circuit, or by a mechanical switch operated by the ends of the boards.

When an electric clutch and brake are used the crank, connecting rod and rack may be replaced by a gear wheel or wheels engaging the toothed segments or by a gear wheel and chain and sprocket gear. The initiation of this clutch may be effected through a circuit including a mechanical or other switch, or through a photo-electric cell controlled by the moving sheets. The clutch is stopped with the inverter in the horizontal position by means, e. g., a switch or relay, operated by the inverter itself or by a unit of the driving mechanism, which de-energises the clutch and applies the brake to the driven mechanism. These variants, however, give poorer results than the previously described mechanical clutches in that the indexing is poorer, with consequently increased tendency for the inverter to stop in the wrong position and for the sheet material to be damaged, and because of the increased danger of extraneous material from the sheet or boards falling into the gears and fouling them. The preferred combination is, however: a solenoid initiating a one revolution and stop clutch, which through a 2:1 reduction gear motivates the crank.

The photo-electric cell and its light source may be positioned in such a way that the leading and trailing ends of the boards themselves obscure and expose the photo-electric cell, but this arrangement has the disadvantage that paper or other extraneous material may interfere with the operation of the cell by obscuring the light source and putting the cell out of action. It is, therefore, preferred to employ a shutter, of suitable dimensions and preferably of pivoted type, to be hereinafter described. By this means the aforesaid disadvantages are obviated, for the cell and its light source can be placed at a convenient height above the moving stream of boards, with the attendant advantages that they are both rendered more accessible for adjustment, cleaning and maintenance, and that the shutter improves the definition of obscuration and exposure. When the cell and its light source are situated above the boards another important advantage of using a shutter is the prevention of interference with the function of the cell by extraneous light. It is desirable that the shutter should be of opaque material.

The following description defines the invention, so far as the chief features are concerned, in its preferred form, which is capable of operating in automatic manner the inversion cycle as hereinbefore defined, viz., reception of a board, rotation through 180° and ejection of the inverted board, with a period of approximately 5 seconds, or less.

The inverter has a cradle for the boards comprising an open shallow rectangular frame, with its long axis in the line of travel of the boards, in which is housed at least a pair of horizontally disposed belt conveyors, each running on drums and idler rollers and adapted to be driven at one of several high speeds (through sprockets by a motor situated on the cradle), and co-operating to draw boards onto, or expel them from, or hold them in, the inverter. The cradle is carried in and rigidly connected to two transverse circular end frames or trunnions of large diameter, each provided with a tyre and formed with a suitably located diametral slot of sufficient width to permit passage of the boards, and each rotatably mounted on four rollers supported in an external frame. A rack wheel comprising two semi-circular toothed segments spaced to permit passage of the boards is bolted to the outer face of each trunnion and cooperates with a horizontal rack adapted for movement in slides. The traverse of the rack is just sufficient to rotate the rack wheel through 180° and thus effect inversion of the cradle during each stroke.

In order to deal with the varying forces met with during the rotation of the inverter cradle, strong springs are provided, each attached to one segment of one of the rack wheels and to the external fixed frame, and serve to absorb or supply energy as required at the end or the beginning of each stroke of the rack. Each rack is moved by a connecting rod motivated by a crank situated on a countershaft which is caused to make one half revolution to rotate the inverter. This is accomplished by a 2:1 reduction gear from an accurate one-revolution-and-stop clutch comprising clutch plates and operating gear driven by an electric motor. The operation of the clutch trip mechanism is by a solenoid whose movement is controlled by a photo-electric cell with its ancillary light source through a circuit to be described in detail later, which includes a thermionic valve and relays. The cell is situated above the main conveyor on the board-receiving end of the inverter and it and its light source are preferably aligned so that the direction of illumination is horizontal and transverse to the axis of the stream of boards. A vertical shutter of design to be hereinafter described, pivoted about a horizontal axis and adapted to be tilted by the leading and released by the trailing ends of the boards is interposed between the cell and its light source. When the shutter is moved by the trailing end of the board, it uncovers the cell and exposes it to the light source thus de-energising the valve circuit.

As will have been gathered from the foregoing description, the belt conveyors on the inverter cradle are required to operate during the times of receiving or expelling a board. It is therefore arranged that there is no connection between the electric mains and the motor driving the belt conveyors during the rotation of the inverter, and that connection is made when the inverter cradle is horizontal. This can be done by connecting the said motor to a number (three being suitable for a 3-phase supply) of spring loaded contact poles suitably situated on the inverter cradle and adapted to engage a similar number of cooperating contacts on the main external frame when the cradle is about to reach the horizontal position, and disengage from them when the cradle has just left the horizontal position. To avoid damage to the boards, the motor should be capable of being brought to rest extremely quickly and this is achieved by fitting it with a spring loaded electro-magnetic shoe brake.

The details of one suitable electrical circuit which comprises two sub-circuits are shown diagrammatically in Figure 1 of the drawings, in which $M_1$ and $M_2$ represent A. C. and D. C. mains respectively, and H. S. emergency hand-operated switches. The circuit is shown with the photo-electric cell in the dark condition, and the solenoid in the de-energised condition.

With reference to the first part of the circuit, that is the photo-electric cell/valve sub-circuit, 1 is the cell, 2 is the light source and 3 is the shutter situated between them. The anode of the cell is connected to the grid 6 and, through a resistance R, to the cathode 7 of the thermionic valve 4, whose cathode 7 is indirectly heated by a low voltage circuit 8. The anode 5 of the valve is connected to a relay 11, comprising coil 10a and condenser 10b, operating the switch 12. The light source and the photo-cell/valve sub-circuit are each fed from the secondary coils of a transformer 9 which has the advantage that they may be run at the optimum voltages.

The switch 12 controls the behaviour of the second sub-circuit, which comprises switch 14 operated by coil 13, delay break relay 40 comprising coil 15 and delay break switch 16, and coil 17 operating the solenoid double pole control switch 18, provided with condensers 19 to reduce sparking, and has the connections shown.

The shutter, in its preferred form, is shown in side elevation in Figure 2 of the drawings, having an obscurer portion 23, and a finger 3a, and is pivoted at 24 in such a way that when the finger leaves the board the shutter tilts back under gravity, so exposing the cell to the light source. To ensure accurate positioning of the board when it comes to rest in the inverter, the photo-cell, shutter and light source unit is adjustably mounted. The bias on the valve is arranged so that the valve is conducting when the cell is dark.

The operation of the electrical circuit will be gathered from the following description.

As the leading end of the board passes the finger 3a the shutter tilts and covers the cell 1. This removes the bias from the grid of the valve 4 and the anode current of the valve closes the switch 12 through the relay 11. This energises coil 13, opens contacts 14 and de-energizes coil 15 which allows contact 16 to re-close.

When the trailing end of the same board passes 3a and allows the shutter to uncover the cell, the bias is re-imposed on the valve grid and the anode current falls to zero, thus de-energising relay 11 and opening switch 12. This in turn de-energises coil 13, closes contact 14 and energizes coil 17 (through contact 16) and coil 15. Coil 17 closes contacts 18 thus energising the solenoid 20 until contact 16 after a delay, which can be adjusted as desired, but generally will be of the order of 1 second, is opened. When the solenoid is thus energised, a rod is pulled which releases the trigger of the clutch operating mechanism.

The modus operandi of the inverter will now be described commencing at the point when the inverter cradle is horizontal and the photo-electric cell is screened by the shutter whose finger is resting on a board about to enter the inverter. The contact poles are engaged with the fixed contacts, thus closing the circuit of the motor which drives the conveyor belts, whereby the board is drawn into the inverter. As the board enters the inverter its trailing end allows the shutter to uncover the photo-electric cell and thus actuate the one-revolution-and-stop mechanism through the electric circuit already described.

The inverter cradle then commences to rotate, whereby the contact poles are disengaged from the fixed contacts, thus deenergising the motor and brake unit and rapidly stopping the conveyor belts. To enable the last-mentioned elements to grip the board, the idler rollers on which they run are preferably spring loaded and rubber covered. On completion of the 180° rotation of the cradle, the poles re-engage the fixed contacts, thus releasing the brake and re-starting the motor driving the belts, whereby the board is expelled from the inverter, and subsequently a fresh board is received on the inverter, thus re-initiating the above-described sequence of operations.

The apparatus therefore inverts a board during each forward and backward stroke of the rack, and in each interval for which the rack is at rest expels an inverted board and receives a fresh board for inverting.

In this form of apparatus best results are obtained employing a delay break mercury switch in preference to the mechanical switch above referred to, or any other type of switch known to us, because it gives better timing at high speeds of operation, and because there is much less wear and tear due to sparking.

It was indicated that the cradle may include more than one pair of conveyors, the object being to enable the inverter to handle several streams of narrow boards simultaneously.

The invention in the preferred form is shown in Figure 6 of the accompanying drawings, which is a perspective view showing the main features. Numeral 100 indicates the shallow rectangular frame with its long axis in the line of travel of the boards 55 on the main plant conveyor 203. For simplicity the structural features of the cradle are not shown in detail. 101 and 101' are the belt conveyors running on a number of spring-loaded, rubber-covered idler rollers 102 and 102', and driven by the high speed motor 103 through sprockets 104. 105 and 105' are the trunnions provided with a diametral slot 106 and rotatably mounted on the rollers 107. 108 is a rack wheel co-operating with the horizontal rack 109 adapted for movement in a slide 110 (only one slide is shown for simplicity). 111 is one of the strong springs attached to the rack wheel 108 and a fixed external point. The rack is motivated by a connecting rod 112 driven by a crank 113 coupled to the one-half-revolution and stop countershaft 114. Numerals 200, 201 and 222 respectively designate the photo-electric cell, shutter and light source. The shutter is preferably provided with a brake in the form of a wedge, against which the shutter is forced by its own impetus and which serves to lock the shutter when the light source is uncovered.

The drive mechanism for the countershaft 114 is shown, in its main features, in Figure 7, in which: numeral 200 indicates a motor 221 a worm reduction gear; 222 a clutch comprising several friction discs; 223 the sliding dog controlling the one revolution and stop engagement of the clutch, with its return spring 224; 225 the clutch engagement spring operating through the lever 226; 227 the 2:1 reduction gearing; 228 the solenoid; 229 the latch which the solenoid releases to engage the clutch; and 113 one of the cranks coupled to the countershaft 114.

In the foregoing account one suitable electric circuit has been described with reference to Figure 1. In this circuit the delay break switch 16 is actuated by a small solenoid 15 which when energised opens the normally closed contacts 16, after a period of time which can be varied as required, controlled by a clockwork mechanism which is itself operated by the solenoid 15 through a spring. Alternatively, and with improved results, there may be used in the circuit instead of switch 16, a tilting delay break mercury switch of the type illustrated in Figure 3 of the drawings (shown in the open position) which is carried on a rotatable support and is comprised of two substantially cylindrical compartments 41 and 42 in the latter of which are two contacts 43 and 44, said compartments being connected by a duct 45 of relatively narrow diameter. When the switch is in the closed position the mercury is largely in compartment 42 and the axis of the switch is as indicated by ZZ'. When the switch 14 (see Figure 1) is closed by the initiating effect of the trailing end of a board, current flows in 17, energising solenoid 20 and in 15 tilting the mercury switch and thus causing the mercury to commence flowing from 42 to 41. Current flows in 17 until the mercury breaks the contact in 42, which takes a distinct time interval owing to the retarded passage of the mercury through the restricted duct 45. Immediately the contact is broken, the solenoid 20 is denergised. The mercury switch is re-set in the closed position by the leading end of the next succeeding board opening contact 14, and de-energising the coil 15, which tilts the switch through about 30° counter-clockwise returning the mercury by tube 46 to 42.

While it is preferred on account of its greater sensitiveness, simplicity, reliability over long periods and the little attention or maintenance required, to employ a photo-electric cell to control the operation of the inverter, nevertheless other control means may be employed, e. g., switches which may be of mechanical or mercury type. Two such controls and their circuits will now be described.

The first of these is illustrated in Figure 4 in which the index numerals have the same significance as in Figure 1. The switch 50 may be of mechanical type, e. g., a lever operated single pole switch, or of mercury type, comprising a cylindrical vessel with two contacts which is adapted for tilting. The switch 50 is normally closed, but is opened when the leading edge of the board passes under it, thus de-energising the solenoid and allowing its trigger mechanism to re-set. The trailing edge of the board permits the switch 50 to re-close, and energise the solenoid, which trips the inverter mechanism, whereby the cradle is inverted. The solenoid remains energised until the same sequence of operation is re-initiated by the leading end of the next succeeding board.

In Figure 5 is shown diagrammatically an improved modification of the actuating sub-circuit illustrated in Figure 4, the solenoid circuit being the same and therefore not shown. The direction of travel of the sheet material is indicated by the arrow. In this modification there are two switches 65 and 66 situated sufficiently near the receiving end of the inverter to enable the board to clear them before movement of the inverter occurs. If smooth operation of the inverter is to be obtained it is important that the switches should be situated at the correct distance from the inverter. This point will be dealt with more fully in connection with the photo-electric cell in the second succeeding paragraph.

These switches may be of the mercury type or may be mechanically operated. With this arrangement, switch 65 is normally closed and switch 66 is normally open, that is to say when no board is under either of the switches. This being so, the leading end of an advancing board opens switch 65 and closes switch 66, thus leaving contactor 17 de-energised until the trailing end of the board passes switch 65, which then closes.

The solenoid 20 is thus energised only by the trailing end of the board. Finally, as the trailing end of the board passes 66 this switch is opened and the solenoid de-energised. This sequence is repeated with each board.

It will be appreciated that the advancing boards are brought to rest very rapidly in the inverter. We have found that, while to give rapid inversion cycles, high running speeds of the conveyors are desirable, nevertheless it is preferable, to avoid excessive wear of motor, motor brake and conveyors, to limit these running speeds to 6 lineal feet per second. In particular it has been found advantageous to operate the inverter conveyors at 6 feet per second when handling 6' long sheets, and at 4 feet per second when handling longer sheets. With a direct current operated solenoid of given characteristics the distance at which the initiating means operated by the sheets should be placed to permit operation at these speeds can be readily determined by those skilled in the art. Thus when using a solenoid with a pull of 20 lbs. and the above range of speeds, it is desirable to position the said initiating means at approximately 5 feet from the inverter inlet when the inverter conveyors are running at 6 feet per second, and at approximately 3 feet when they are running at 4 feet per second.

Among further alternative features of the invention may be mentioned the following.

When the toothed member driving the pinion wheel is a gear wheel, the pinion may be a large diameter spurred ring.

Moreover, when the said toothed member is a gear wheel, the inverter may be rotated through 180° each time in the same angular direction.

When a gear is used, the springs are preferably situated on the stationary external frame and are compression springs which come into play towards the end of the inversion by contact with suitably disposed stops on the inverter. Alternatively they may be replaced by elastic stops, e. g., of rubber or by pneumatic springs, e. g., pistons in cylinders.

Furthermore, the means for supplying current to the inverter conveyor motor may comprise spring loaded members arranged to make contact, when the inverter reaches the horizontal position, with slip rings provided on the inverter.

We claim:

1. A single deck inverter, for material in the form of sheets such as plasterboard, capable of operating at high speeds which comprises, in combination: a cradle in the form of an open shallow frame with its long axis in the line of travel of the sheets, having housed therein at least one pair of driven horizontally disposed conveyors for reception of the sheets, a motor for driving the said conveyors, and carried in and rigidly connected to two transverse circular end frames or trunnions, each having a relatively large diameter, and formed with a suitably located diametral slot shaped and positioned to permit passage of the sheets, and each rotatably mounted on suitably supported rollers; at least one rack wheel comprising two semi-circular toothed segments spaced to permit passage of the sheets and rigidly connected to the outer face of a trunnion; at least one horizontal rack co-operating with the toothed segments, and adapted for movement in slides, and which has a traverse just sufficient to rotate the rack wheel through 180°; at least one strong spring attached at one end to a rack wheel and at the other to an external fixed point; at least one connecting rod for moving a rack motivated by a crank situated on a countershaft, which is compelled to make one half revolution and stop; means for driving the countershaft; and means for initiating the driving of the countershaft controlled by the moving sheets.

2. An inverter as claimed in claim 1 in which the means initiating the driving of the countershaft comprises: a solenoid operating a trigger mechanism; and an electrical circuit including a source of electrical energy, a coil contactor for energising the solenoid, and a switch operated by the moving sheets; the arrangement being such that the leading end of a sheet opens the switch, which is normally closed, so as to deenergise the solenoid and allow the trigger mechanism to re-set, and the trailing edge of the same board permits the switch to re-close and energise the solenoid, which releases the trigger mechanism thus initiating the driving of the countershaft and the inversion of the cradle.

3. An inverter as claimed in claim 1 in which the means initiating the driving of the countershaft comprises a solenoid operating a trigger mechanism, and an electrical circuit including a source of electrical energy, a coil contactor for energising the solenoid and two switches operated by the moving sheets and situated sufficiently near the receiving end of the inverter to enable the sheet to clear them before movement of the inverter occurs; the arrangement being such that the first switch, which is further from the inverter, is normally closed and the second open, and that the leading end of an advancing sheet opens the first and closes the second, so leaving the solenoid control coil de-energised until the trailing end of the sheet passes the first switch which then closes to energise the solenoid until the trailing edge of the same sheet opens the second switch, and de-energises the solenoid.

4. A single deck inverter for sheet material such as plasterboard capable of operating at high speeds which comprises: a cradle in which is housed at least one pair of horizontally disposed belt conveyors each running on drums and idler rollers and adapted to be driven at one of several high speeds and cooperating to draw boards onto, hold them in, and expel them from the inverter, which cradle is carried in and rigidly connected to two transverse circular end frames of large diameter formed with a suitably located diametral slot permitting passage of the boards, and rotatably mounted on suitable members; a rack wheel comprising toothed segments spaced to permit passage of the boards rigidly attached to the outer face of each trunnion; at least one strong spring for absorbing and supplying energy from and to a trunnion; a horizontal rack co-operating with the rack wheel; a connecting rod attached to the rack and a crank driven by a counter-shaft compelled by suitable means to make one half revolution and stop; a latch operated by a solenoid for initiating the means compelling the half revolution; an electric circuit including a thermionic valve for energising the solenoid controlled by a photoelectric cell which is obscured from and exposed to a light source under the effect of a pivoted shutter regulated by the moving sheets.

5. An inverter as claimed in claim 4 in which the inverter conveyor motor is connected to contacts on the inverter adapted to engage co-operating fixed contacts when the inverter is in the horizontal position.

6. An inverter as claimed in claim 4 in which each trunnion is provided with a strong spring and with a rack wheel cooperating with a rack driven by a connecting rod and crank, the cranks being connected to the same counter-shaft.

7. An inverter as claimed in claim 4 in which the electrical circuit controlling the solenoid comprises a valve sub-circuit controlling the solenoid including a photo-electric cell, a thermionic valve, a relay and a first switch operable by the relay, said switch controlling a second sub-circuit comprising a source of electrical energy, a second switch controlling a network including a time delay break switch and a contactor coil for closing the solenoid circuit, the whole being arranged so that: the valve bias is such that it is conducting when the cell is dark; that the bias is removed when the leading end of a sheet tilts the shutter to cover the cell so closing the first switch which then opens the second switch and de-energises the coil controlling the time delay switch, thus re-closing the latter; and that the bias is re-imposed when the trailing end of the same sheet tilts the shutter and uncovers the cell, so opening the first switch, thus closing the second switch, which then energises the contactor coil and hence the solenoid, which thus energised pulls a rod releasing the trigger of the clutch operating mechanism, until the time delay switch is fully open.

8. An inverter as claimed in claim 4 in which the electrical circuit controlling the solenoid comprises a valve sub-circuit including a photo-electric cell, a thermionic valve, a relay and a first switch operable by the relay, said switch controlling a second sub-circuit comprising a source of supply, a second switch controlling a net including a mercury time delay break switch and a contactor coil for closing the solenoid circuit, the whole being arranged so that: the valve bias is such that it is conducting when the cell is dark; that the bias is removed when the leading end of a sheet tilts the shutter to cover the cell so closing the first switch, which then opens the second switch and de-energises the coil controlling the mercury time delay switch, thus re-closing the latter; and that the bias is re-imposed when the trailing end of the same sheet tilts the shutter and uncovers the cell so opening the first switch, thus closing the second switch, which then energises the contactor coil to energise the solenoid, which pulls a rod releasing the trigger of the clutch operating mechanism, until the mercury time delay break switch is fully open.

9. A single deck inverter for sheet material such as plasterboard capable of operating at very high speeds which comprises a cradle in the form of a rectangular frame in which is housed at least one pair of horizontally disposed belt conveyors each running on drums and idler rollers covered with a flexible material such as rubber and spring loaded and adapted to be driven when the inverter is in the horizontal position by a motor fitted with an electromagnetic shoe brake and cooperating to draw boards onto, and hold them on, and expel them from the inverter, which cradle is carried in and rigidly connected to two transverse circular end frames of large diameter formed with a suitably located diametral slot permitting passage of the boards, and rotatably mounted on rollers; a rack wheel comprising toothed segments spaced to permit passage of the boards rigidly attached to the outer face of each trunnion; at least one strong spring for absorbing and supplying energy from and to each trunnion; a horizontal rack co-operating with each rack wheel; a connecting rod connected to each rack and to a crank driven by a common countershaft compelled to make one half revolution and stop; means for compelling the countershaft in this manner comprising a source of mechanical energy, a clutch, a dog, a 2:1 reduction gear, an initiating latch operated by a solenoid, and a photo-electric cell regulated by the moving boards, through the medium of a pivoted shutter, and controlling the behaviour of the solenoid through an electric circuit comprising a first sub-circuit including the photo-electric cell, a thermionic valve, a relay and a first switch controlling a second sub-circuit comprising a source of electrical energy, a second switch controlling a net including a tilting mercury time delay switch and a contactor coil for closing the solenoid circuit.

10. An inverter as claimed in claim 9 in which the operating speed of the inverter conveyors is from 4 to 6 feet per minute and the photo-electric cell is situated from 3 to 5 feet from the entry to the inverter.

11. A single deck inverter for material such as plasterboard that is being conveyed in a stream of sheets, which comprises in combination: a cradle with its long axis in the line of travel of the sheets, having housed therein at least one pair of driven conveyors for reception of the sheets and a motor for driving the said conveyors, and carried by and rigidly connected to at least two transverse trunnions each having a relatively large diameter, each shaped to permit passage of the sheets and each rotatably mounted; at least one arcuate toothed member connected to a trunnion; a second toothed member cooperating with the said arcuate toothed member and adapted to rotate it; a positive drive for the second toothed member; means controlling the said drive and giving accurate register between the cradle and the main plant conveyor handling the stream of sheets; and an electric circuit initiated by the moving sheets for controlling said means.

12. A single deck inverter as claimed in claim 11 in which the motor driving the conveyors is provided with means for de-energizing and energizing it comprising contacts situated on the cradle, and with a spring loaded brake adapted for disengagement electromagnetically through closure of the said contacts.

13. A single deck inverter for material such as plasterboard, that is being conveyed in a stream of sheets which comprises in combination: a cradle with its long axis in the line of travel of the sheets having housed therein at least one pair of driven conveyors adapted for reception of the sheets and a motor for driving said conveyors, and carried by and rigidly connected to at least two transverse trunnions each having a relatively large diameter, each shaped to permit passage of the sheets, and each rotatably mounted; at least one arcuate toothed member connected to a trunnion; at least one horizontal rack co-operating with the said toothed member and having a traverse just sufficient to rotate the rack wheel through 180°; a crank driving said rack through a connecting rod and situated on a shaft which is compelled to make one half revolution and stop; means for driving the countershaft; and means for initiating the driving of the countershaft controlled by the moving sheets.

14. A single deck inverter as claimed in claim 13 in which the motor driving the conveyors is provided with means for de-energizing and energizing it comprising contacts situated on the cradle, and with a spring loaded brake adapted for disengagement electromagnetically through closure of the said contacts.

WILLIAM HECTOR MACLENNAN.
ERNEST CAMERON CLARK.
MARY LOWRIE,
*Sole Executrix of the Estate of William James Douglas Lowrie, Deceased.*

REFERENCES CITED

The following references are of record in the file of this patent:

UNITED STATES PATENTS

| Number | Name | Date |
| --- | --- | --- |
| 837,379 | Blair | Dec. 4, 1906 |
| 1,915,672 | Ives | June 27, 1933 |